No. 833,680. PATENTED OCT. 16, 1906.
W. B. DENNIS.
APPARATUS FOR TREATING SUBSTANCES BY THE AID OF HEAT.
APPLICATION FILED FEB. 28, 1906.

6 SHEETS—SHEET 1.

No. 833,680. PATENTED OCT. 16, 1906.
W. B. DENNIS.
APPARATUS FOR TREATING SUBSTANCES BY THE AID OF HEAT.
APPLICATION FILED FEB. 28, 1906.

6 SHEETS—SHEET 5.

No. 833,680. PATENTED OCT. 16, 1906.
W. B. DENNIS.
APPARATUS FOR TREATING SUBSTANCES BY THE AID OF HEAT.
APPLICATION FILED FEB. 28, 1906.

6 SHEETS—SHEET 6.

Witnesses
Inventor
W. B. Dennis,
By Wilkinson
& Fisher,
Attorneys

UNITED STATES PATENT OFFICE.

WILLIAM B. DENNIS, OF BLACKBUTTE, OREGON.

APPARATUS FOR TREATING SUBSTANCES BY THE AID OF HEAT.

No. 833,680. Specification of Letters Patent. Patented Oct. 16, 1906.

Original application filed January 4, 1906, Serial No. 294,594. Divided and this application filed February 28, 1906. Serial No. 303,536.

*To all whom it may concern:*

Be it known that I, William B. Dennis, a citizen of the United States, residing at Blackbutte, in the county of Lane and State of Oregon, have invented certain new and useful Improvements in Apparatus for Treating Substances by the Aid of Heat; and I do hereby declare the following to be a full, clear, and exact description of the invention, such as will enable others skilled in the art to which it appertains to make and use the same.

My invention relates to apparatus for treating substances by the aid of heat, this application being a division of a former application, Serial No. 294,594, filed January 4, 1906.

My apparatus is primarily intended for treating ores or other materials for the purpose of volatilizing the contained metals or other elements and for roasting, desulfurizing, chloridizing, calcining, oxidizing, heating, drying, smelting, and any other purposes for which ores or other materials are treated by the aid of heat.

The accompanying drawings illustrate my improved apparatus; but my invention is not confined to the particular form, assemblage of parts, and details of construction therein shown. Alterations may be required in order to conform to the special requirements of the substances to be treated and the various purposes, as above named, to which the apparatus may be applied. Such alterations, however, may be made without departing from the basic features and scope of my invention.

Figure 1:
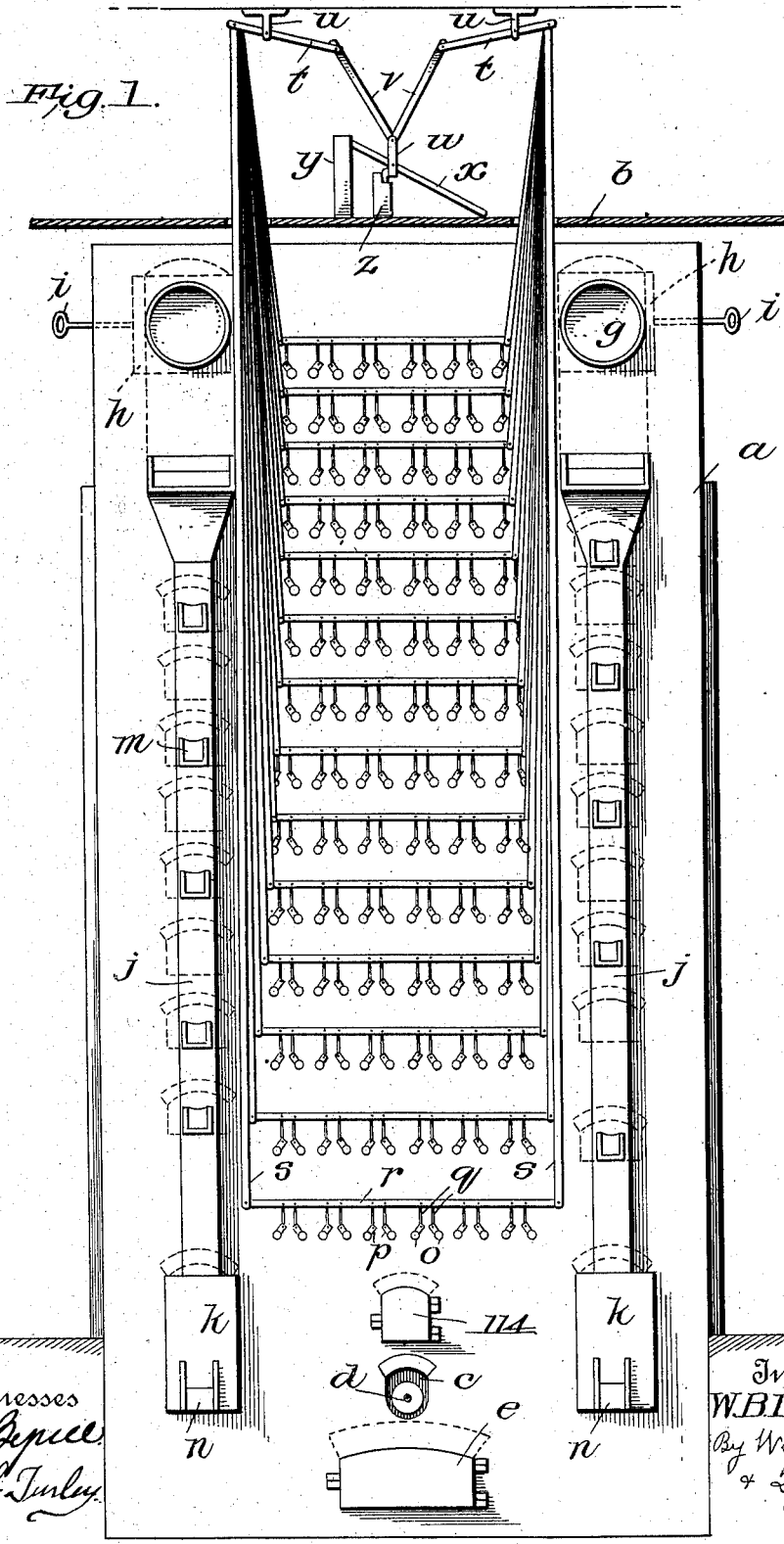
Figure 2:
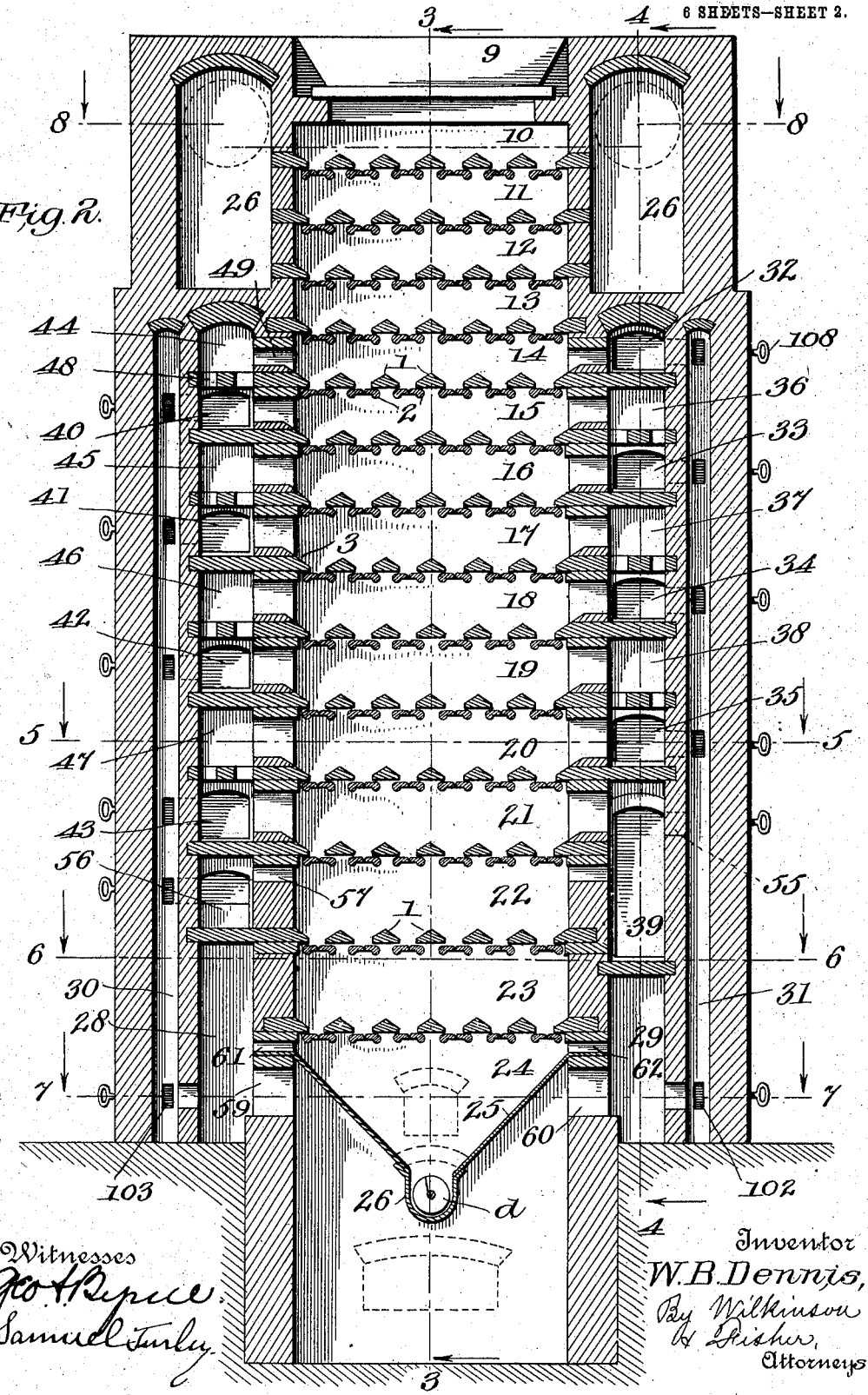
Figure 3:
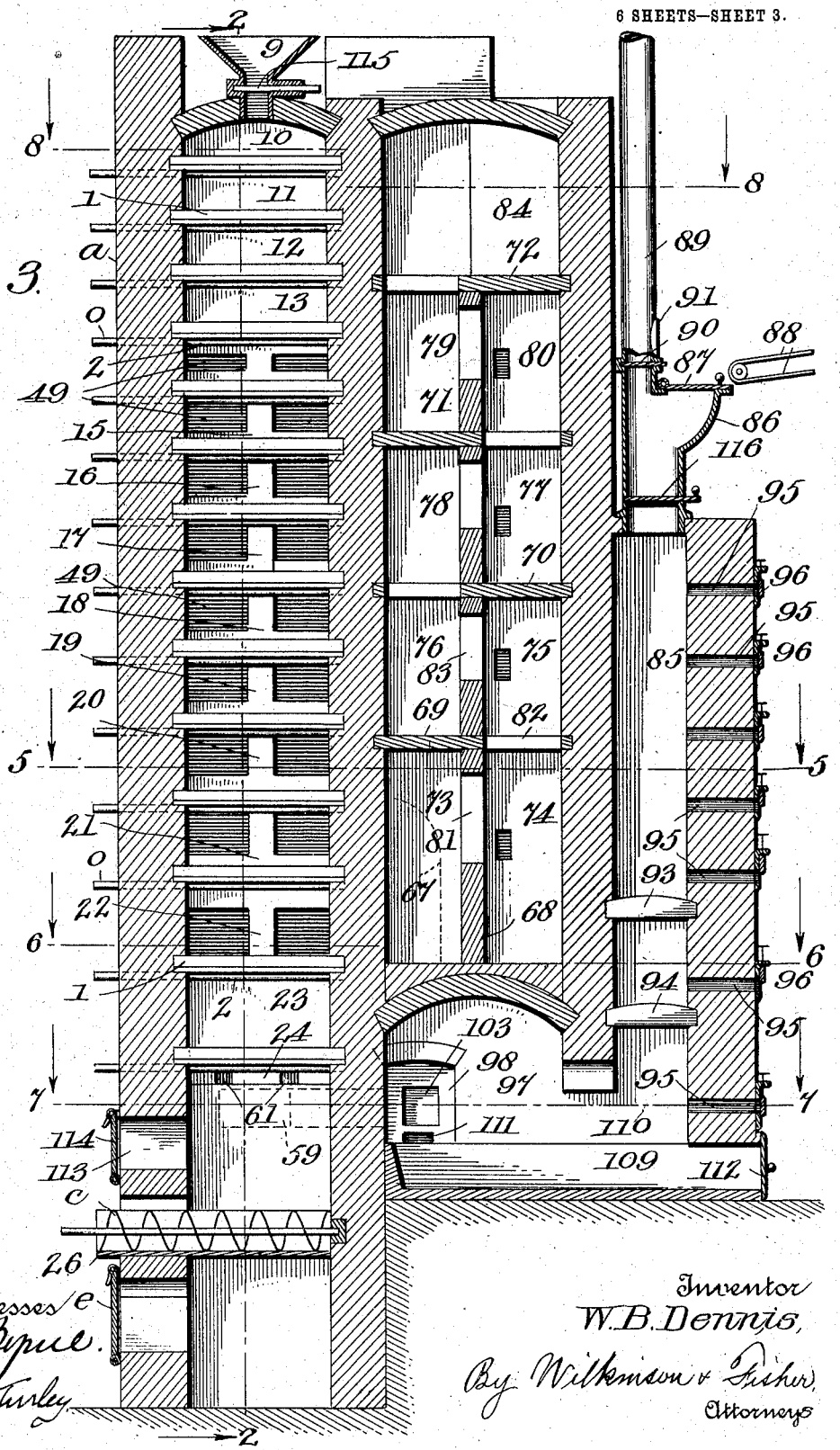
Figure 4:
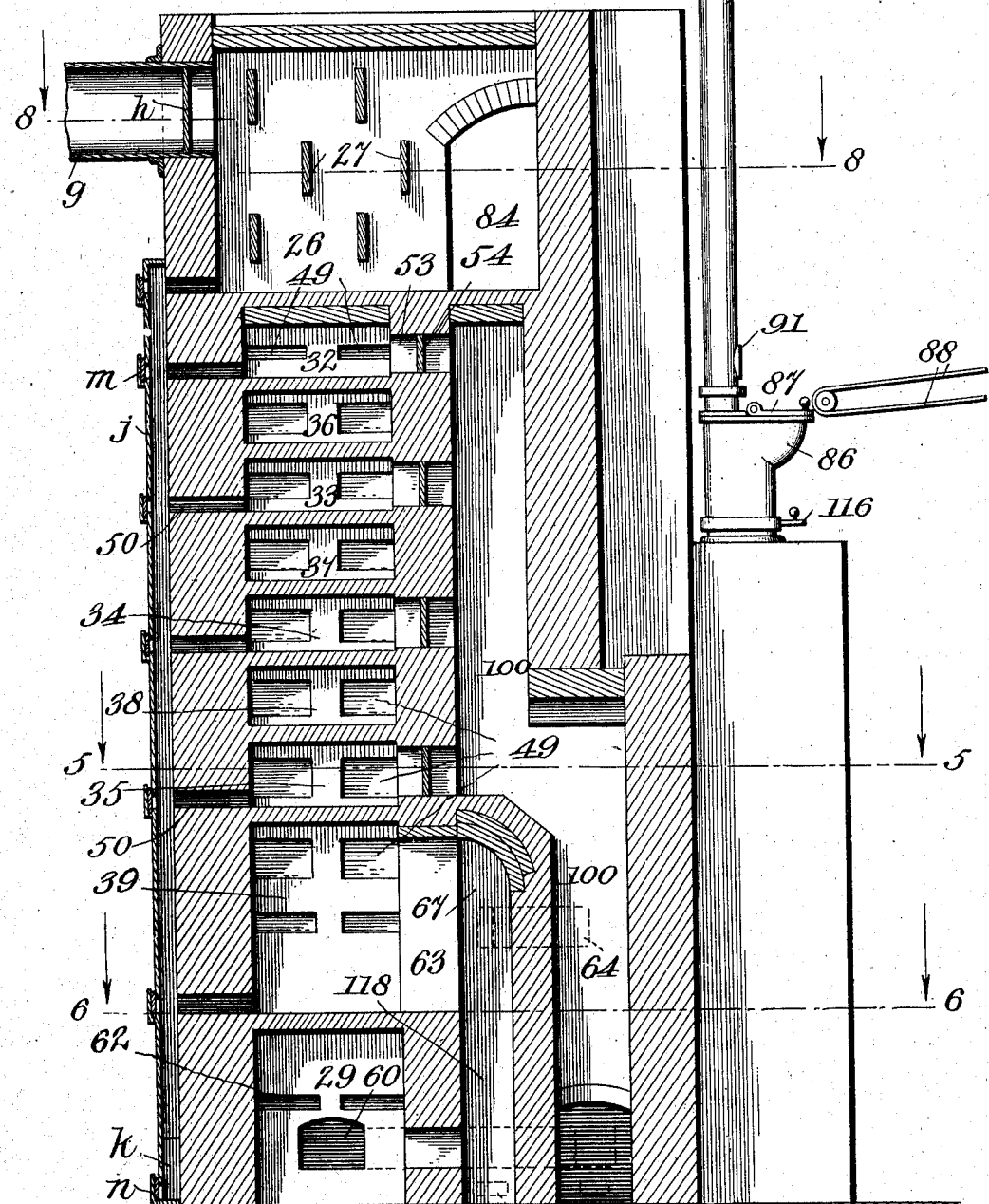
Figure 5:
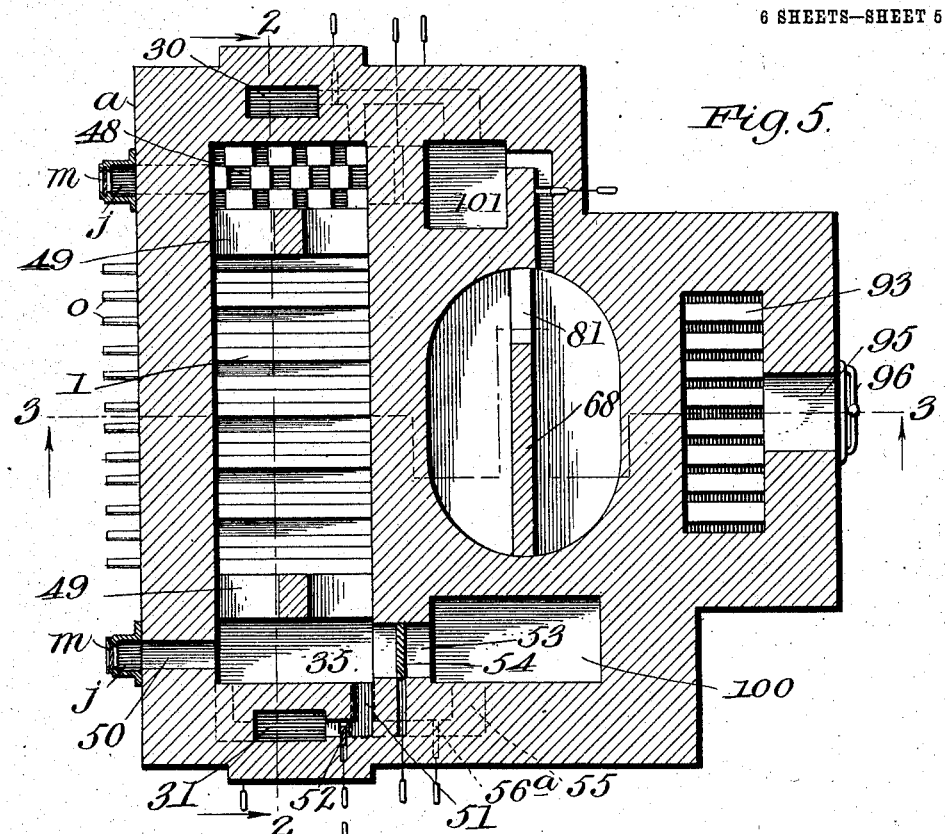
Figure 6:
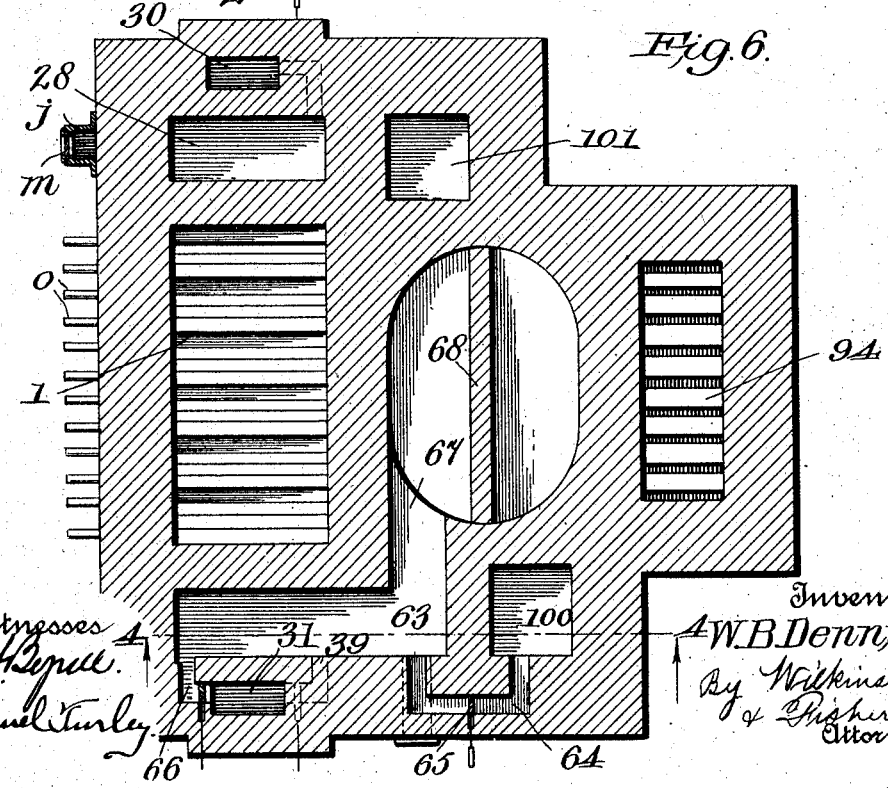
Figure 7:
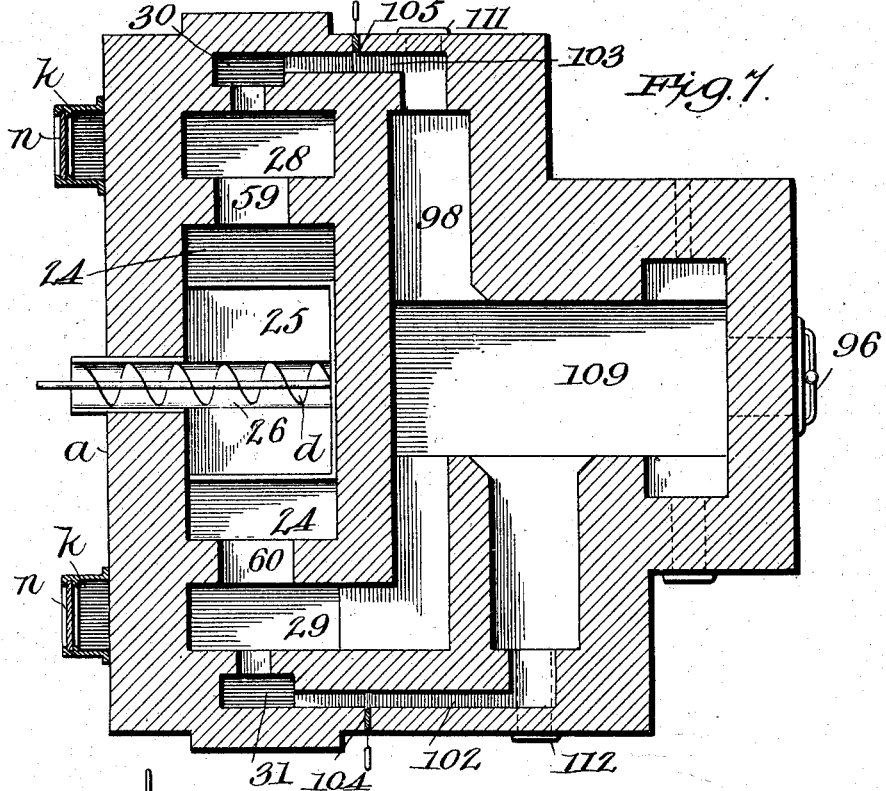
Figure 8:
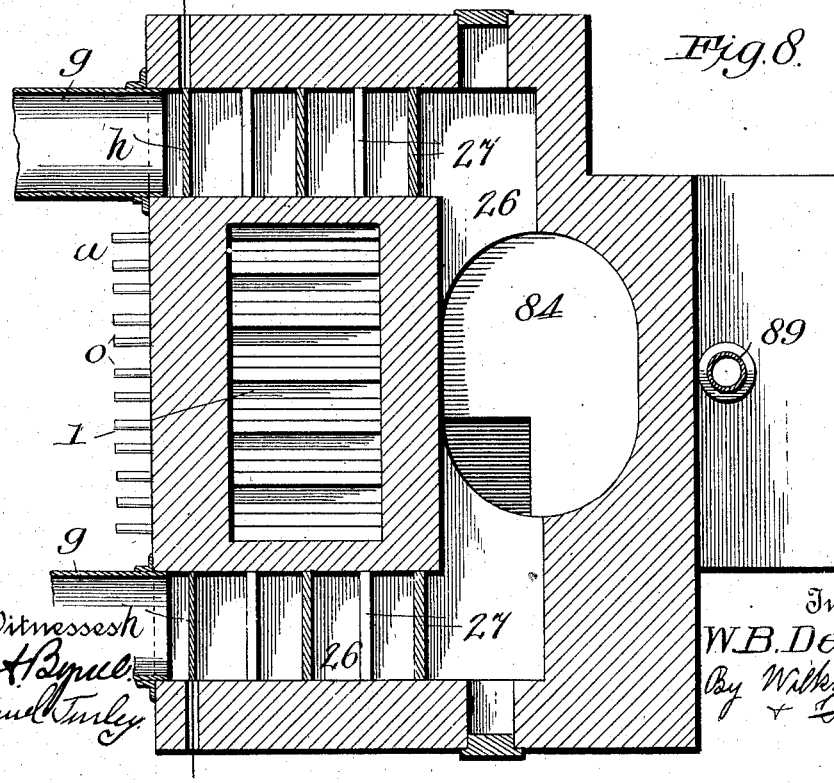

Referring to the drawings, Figure 1 is a front view of the same. Fig. 2 is a section on the lines 2 2 of Figs. 3 and 5 and looking in the direction of the arrows. Fig. 3 is a section on the lines 3 3 of Figs. 2 and 5 and looking in the direction of the arrows. Fig. 4 is a section on the lines 4 4 of Figs. 2 and 6 and looking in the direction of the arrows Fig. 5 is a section on the lines 5 5 of Figs. 2, 3, and 4 and looking in the direction of the arrows. Fig. 6 is a section on the lines 6 6 of Figs. 2, 3, and 4 and looking in the direction of the arrows. Fig. 7 is a section on the lines 7 7 of Figs. 2 and 3 and looking in the direction of the arrows. Fig. 8 is a section on the lines 8 8 of Figs. 2, 3, and 4 and looking in the direction of the arrows; and Fig. 9 is a detail sectional view of one of the grate-bars.

In the ordinary method of treating substances, including ores, by the aid of heat the fuel-gas or heat-current is introduced into one end of the ore-receptacle and is allowed to pass through or over the ore in the direction opposite to the ore travel. Thus the ore moving toward the inlet becomes gradually heated and the current flowing in the opposite direction becomes gradually cooled. This method is applied with variations in many different types of metallurgical plants and is usually described as "continuous gradual heating" and is popularly accepted as an economical method of utilizing fuel energy; but in this method a well-known law of thermodynamics has been lost sight of, and the economy of fuel energy is obtained at the expense of efficiency and of volume of ore treated per diem in the furnace. By my process I secure equal or greater heat economy and at the same time also a great increase in comparative efficiency and per diem ore tonnage treated. The law of thermodynamics above referred to is that the quantity of heat conducted from one body to another in a given time depends on the difference in temperature between the bodies, or, in other words, is proportional to the temperature slope between the bodies—the steeper the slope the greater the amount of heat conducted. In the practical operation of a metallurgical furnace the problem presented is to induct into an ore-body of given mass a given quantity of heat in the shortest possible space of time and with a minimum loss of heat units. From an economic standpoint the principal factors of this problem are the quantity of heat, measured by the cost of its production, and the amount of time required for its induction into the ore. Since both of these factors are to be measured by the same standard—namely, cost in dollars and cents—their relative importance may be readily determined and the economic balance between them ascertained. Upon the amount of time consumed in the operation of heating the ore to the desired temperature depends the per-diem capacity of the furnace, which in turn is the chief factor in determining the per-ton cost of treatment. Time, therefore, is the paramount factor in the furnace problem, and since according to the law of thermodynamics above referred to the rate of heat absorption depends upon the steepness of the temperature slope between the heat conveying and receiving bodies it follows that to secure high efficiency and economy in furnace practice due regard must be paid to the proportional temperatures of fuel-gas and ore. In the practice of gradual heating, as above explained, and in all other commonly-employed methods of applying heat to ore the value of this law has not only been overlooked, but the operation is carried on in diametrical violation of the principle, with the resultant loss of efficiency and reduced economy.

If normally cold ore is subjected to fuel-gases at maximum temperature, the momentary rate of absorption is rapid, due to the extreme steepness of temperature slope; but since the temperature of the ore is continually rising by contact with the hot gas in order to maintain the same pitch of slope until the ore has attained the desired temperature a continuous proportional increase of gas temperature would be required, which would be impracticable in the case named. Neither would it be economical from a dollars-and-cents point of view to continually supply heat at maximum temperature to a body of ore continuously rising in temperature, because the proportional quantity of supplied heat utilized or absorbed by the ore would be continually decreasing in ratio to the decreasing pitch of temperature slope. Economy demands that a uniform pitch shall be maintained throughout the operation, and since it is impracticable to maintain the extreme pitch the economic means must be determined and become the working basis. In practicable furnace-work this involves the consideration of the cost of producing the heat, as well as the calculation of the mere mathematical mean. The theoretical application of this law to the operation of heating a given mass of ore demands the maintenance of the economic mean pitch at each unit of contact between fuel-gas and ore. When applied to heating a large mass of ore, such as is required in furnace practice, the practical approximation of the theoretical demand is to separate the ore mass into as many divided units of convenient bulk as practicable and to maintain uniformly the economic mean temperature slope in each such unit. This I have accomplished by dividing the ore-receptacle of my furnace into zones and by providing means for adjusting and regulating the temperature slope between the ore and the heat-current or fuel-gas in such zones. Adjustment and regulation of the temperature slope between the heat-conveying and heat-receiving mediums has never been attempted hitherto nor is it possible in any of the existing types of furnaces. By practical tests I have shown that with some ores the capacity of the furnace is thus increased six times, the ore and fuel-gas traveling in the same general direction.

In furnace practice it is customary to introduce the fuel-gas or heat into one end of the ore-receptacle and after passing it through or over the ore, to which its heat is gradually imparted, discharge it at reduced temperature at the opposite end, usually in proximity to the ore-charging hopper. The travel of the heat-current is always from a hotter to a cooler unit, the admission being at the hottest and the discharge at the coolest end. Many evils are created by this method and the efficiency of the furnace reduced. In my apparatus the furnace-gases or heat-current are caused to flow through the ore-containing receptacle from the cooler portion or portions to the hotter portions thereof and to be finally discharged from the hottest zone thereof, preferably in a continuous stream, but always from a cooler to a hotter unit—diametrically opposite to the usual practice. Great economy of heat is accomplished by this method and many evils in furnace practice corrected.

All metallurgical furnaces are greatly troubled with losses sustained through the exhaust-flue or smoke-stack, variously estimated at from two to twelve per cent. of the ore fed to the furnace. Many methods and devices at large expense have been devised to prevent these losses. These efforts, however, have been in the direction of allaying the disease without removing the cause thereof and are confessions of the imperfection of the orignal furnace process and involve heavy expense and incidental loss. A current of hot gas flowing through a receptacle filled with broken ore will carry with it fine particles of ore, the amount depending on the velocity of the current, the movement of the ore in the receptacle, and other conditions. If the current moves from the hottest or roasting end of the ore-receptacle toward the cooler end, the major part of the dust carried along will be particles of raw ore. By my apparatus the direction of gas travel is reversed and the raw ore-dust picked up from the cooler parts of the ore mass being compelled to travel through the roasting or smelting zone is subjected to the requisite reducing or treating temperature before it can pass out of the ore-receptacle. By my apparatus it is impossible, therefore, for any unroasted or untreated ore fines or dust to escape, by which greater economy of fuel energy and furnace efficiency are secured and secondary processes and contrivances for treating flue-dust are dispensed with, while the discharge of smoke and obnoxious gases from the smoke-stack is prevented.

In the utilization of heat my apparatus is equally as economical as the old method, if not more so, the escaping heat from a cooler zone being utilized to supplement or increase the volume and intensify the heat in the next hotter zone. The gas-current is compelled, after passing through the ore-receptacle, to pass through a superheated chamber or duct before passing to the dust-chamber or exhaust-flue, preferably located immediately following the gas-exit of the ore-receptacle and maintained at a temperature equal to or slightly above the boiling-point of the metal or metallic compounds in the ore-receptacle. If the hot gases were then allowed to escape into the air at their maximum temperature, the advantages would more than compensate for the loss in heat units; but this heat, however, is not thrown away, but is utilized to dry and heat the ore in the initial or earlier zones of the ore-receptacles.

In my apparatus a less quantity of dust will escape from the ore-tower than by the old method, and all that does escape will be thoroughly roasted or treated. This is especially true when my apparatus is used with vertical or shaft furnaces, as in pulling the gases downward the dust tends to settle by gravity and is brought into contact with the hot ore, through which it must travel before reaching the exhaust-flue.

In addition to the advantages described my apparatus possesses peculiar and important advantages in the subliming of ores, such as quicksilver, zinc, lead, &c. By the old method of passing the gases from the hotter to the cooler parts of the ore-receptacle a portion of the metallic fumes contained in the gases was condensed and precipitated on the cooler ore, the temperature of which was always necessarily below the boiling-point of the metal under treatment. This was not only clumsy, but it also entailed considerable loss, since the precipitated metal must be resublimed when the ore on which it rests reaches the hottest part of the ore-receptacle. Hence a continuous rotary action of the metal was set up in the furnace, and in practice a portion of this metal invariably escaped sublimation and was lost in the cinder-pit. By my apparatus secondary condensation is impossible.

Since in my apparatus no valuable metals can be contained in the flue-dust, it is clear that dust-collecting devices are not usually needed; but in some cases they are desirable, as in treating the ores of quicksilver, zinc, &c., when it is desired to prevent the dust from entering the condensation-chambers. In my apparatus it is not necessary to separately treat the flue-dust, since this dust is thoroughly oxidized and contains no raw ore and is collected in a chamber kept at a temperature above the boiling-point of the metal in the ore under treatment, so that the metal is sublimed. This feature of passing the gases after treatment of the ore, which gases often carry along with them ore-dust, through a final superheated dust-chamber is of great importance, especially in subliming-furnaces, for, first, preventing the condensation and precipitation therein of volatilized metals during the operation of precipitating the dust; and, second, treating or reducing raw ore-dust within the dust-chamber in order that the dust residue shall not contain any valuable metals.

The value of the principle of perfect combustion of fuel is universally recognized. Sufficient importance has not been attached to it, however, in connection with metallurgical furnaces. In separating by the aid of heat metals from their ores, especially in furnaces of the open-hearth or reverberatory patterns, or in all that class of furnaces in which the fuel combustion products come into direct contact with the ore, perfect combustion is of far-reaching importance. Its importance is not confined to the economy of fuel and the prevention of the smoke nuisance, but has a direct bearing upon the efficiency of the treating process itself. It must be borne in mind that a metallurgical furnace has to deal also with combustible matter other than fuel. It is equally as important to secure perfect combustion of all organic or other matter capable of oxidation which may be contained in or associated with the ore or other substance fed to the furnace; but this appears to have been generally overlooked. Those who have striven for good combustion as a mode of economy or otherwise have generally confined their attention to the fuel and appear to have been satisfied with releasing the ore-combustibles and permititng them to escape to the flue in a state of imperfect oxidation. This practice entails many of the evils from which metallurgical furnaces suffer as well as overlooks the thermal value of the ore-combustibles as a means of economy. In my apparatus perfect combustion of all the fuel is not only accomplished, but also perfect oxidation of all the oxidizable constituents of the ore, resulting in the prevention of the evils and the attainment of the advantages set forth above.

In my apparatus I employ the following arrangement:

First. A combustion-chamber of suitable form and dimensions is placed between the source of fuel-gas supply and each gas-inlet into the ore-receptacle in such a position that the fuel-gas must pass through the combustion-chamber before entering the ore-receptacle. This chamber is preferably placed immediately before the gas-inlet into the receptacle, and provision is also made for admitting a regulated quantity of air into the chamber. These chambers I call "primary combustion-chambers."

Second. A combustion-chamber is placed at each gas-exit from the ore-receptacle, so that upon leaving the ore-receptacle the gas must pass through the combustion-chamber. This chamber is preferably in immediate proximity to said gas-exit. No provision is made for the entrance of an additional supply of gas into these chambers, which I call "secondary combustion-chambers;" but a regulated supply of air may be admitted into said secondary combustion-chambers, if desired.

Third. A final combustion-chamber, preferably superheated, is placed in such position, preferably immediately following the last gas-exit from the ore-receptacle, that all of the furnace-gases must pass through said final combustion-chamber before being discharged into the atmosphere and preferably before reaching the dust-chamber.

Fourth. Suitable means for admitting air under control and preferably heated into both primary and secondary combustion-chambers and the final combustion-chamber is provided.

Fifth. A primary combustion-chamber is placed at the admission end and a secondary combustion-chamber at the discharge end of the ore-receptacle and in like manner at opposite ends of each zone thereof—that is, each zone to which fuel-gas is admitted. These combustion-chambers are so placed that the fuel-gas before entering the ore-receptacle or any zones thereof must first pass through said primary chamber and after being discharged from the ore-receptacle or any zone thereof must pass through said secondary combustion-chamber. A series composed of said primary and secondary combustion-chambers is provided on each side of the ore-receptacle, registering with the zones thereof, the primary combustion-chambers of one series being opposite the secondary combustion chambers of the other series, each secondary combustion-chamber delivering into the next primary combustion-chamber of its own series.

Sixth. I provide suitable means for supplying, under control, each primary combustion-chamber of both series with fuel-gas or heat from the initial source and for causing the heat-current thus supplied to the first primary combustion-chamber of the initial series to flow into the corresponding zone of the ore-receptacle and thence into the corresponding secondary combustion-chamber of the series on the opposite side, thence into the next primary combustion-chamber of its own series on the same side of the receptacle, wherein it unites with the heat or gas-current flowing from the initial source of supply to that primary chamber as above described, and continuing on its way the now recuperated gas-current flows back into the next corresponding zone of the ore-receptacle and thence into the corresponding secondary combustion-chamber of the series on the opposite side, the flow being continued in a similar manner through all the chambers of the two series and all the zones of the ore-receptacle to the final superheated combustion-chamber, from which the gases are finally discharged.

One distinctive feature of my apparatus is the means of generating heat from fuel, which may be used in connection with my ore-treating furnace, but which is also capable of general application. In this part of the apparatus the fuel mass is oxidized gradually, or by degrees, in progressive zones of combustion by admitting to each zone a volume of air measured in proportion to the temperature of the fuel in such zone; and of causing the evolved gases and vapors of each zone to pass into and through the next succeeding zone in the line of progression of the combustion process, the travel of the evolved gases or products of combustion, being always from a zone of lesser to one of more advanced combustion, or from a cooler to a hotter zone, beginning with the zone of incipient combustion the evolved gases moving from zone to zone, pass through the entire fuel mass, and are discharged from the zone of final or last combustion at a point below the last air-inlet of the combustion series; and of causing the evolved gases or combustion products after being discharged from the last or final oxidizing zone at a point below the last air-inlet of the combustion series to pass into and through a reducing or enriching zone or receptacle containing highly heated or incandescent carbon, preferably to pass through said carbon, and into which zone no oxygen or air is admitted other than that already contained in the fuel-gases admitted thereto; and in combination with the foregoing of employing what is commonly known as a "downdraft," preferably produced by mechanical suction. This method of oxidizing fuel and generating heat and gas therefrom may be conveniently described as "gradual combustion," and in practical operation it consists of dividing the fuel mass and the receptacle containing it into a series of units or zones and of supplying each unit with the minimum amount of oxygen or air which can chemically combine with the fuel elements at the temperature of such unit, thereby procuring the decomposition of the fuel, gradually beginning with the initial unit of nascent combustion at one end of the fuel mass or receptacle and progressing from unit to unit or zone to zone until complete decomposition is accomplished at the last or final zone of combustion. By this method perfect chemical union of the evolved fuel elements with the air at or near the theoretical chemical minimum is made possible and a uniform gas therefore produced. The uniform constituency of the gas is further assured by causing it to pass through a reducing zone, as above described.

In the ordinary practice the volume of air required to support combustion of the entire fuel mass is admitted at one or more points, usually an excessive volume and without regard to the temperature or chemical requirements of the fuel at the point of admission. Under these conditions perfect mixture, and therefore the production of a uniform gas, is impossible. The fuel zone immediately adjacent to the admission-point burns rapidly with a great excess of air, while areas farther removed are not supplied with sufficient air to support perfect combustion. This produces a confusion of chemical actions and reactions within the combustion area and results in the production of the highly objectional semidistillation products and in the loss of a considerable portion of the calorific value of the fuel. With the imperfect mixture which this practice involves uniform elementary change throughout the combustion area is impossible, and it is likewise impossible to regulate the supply of air in proportion to the chemical requirements of perfect combustion. In my method of gradual combustion the air is supplied at frequent intervals to each unit or zone in amount proportional to the capacity of the fuel elements in such zone to chemically combine therewith, the measure of which capacity is the temperature of the fuel per unit. In the zone of incipient oxidation, where the temperature is comparatively low, only water-vapor ($H_2O$) is liberated, and only sufficient air is supplied to produce this result. In the next zone of the series, the temperature being somewhat higher than the preceding one, the lighter hydrocarbons are released and sufficient additional air only is supplied to support this degree of combustion. In like manner from zone to zone the process of combustion is advanced gradually, or by degrees, and sufficient additional air is supplied to each zone to support the proportional duty of that zone to the whole process, until complete oxidation has been accomplished finally in the last combustion zone of the series, and the gaseous products are delivered into the reducing-chamber, as previously described, where the well-known reaction takes place, resulting in reduction of the carbon dioxid ($CO_2$) and water ($H_2O$) into carbonic oxid (CO) and hydrogen, (H.) It is evident by this method, which is exceedingly simple and capable of general application, that perfect mixture of air with the evolved gases is secured, that the supply of air may easily be regulated in proportion to the chemical requirements, and that the entire fuel-body is uniformly oxidized without any of the objectionable semidistillation products and without loss of any portion of the calorific value of the fuel.

In the drawings I have shown one suitable form of a gas-producing apparatus, of which the generator element is a vertical shaft of suitable form and material. A series of air-inlets controlled by valves and placed at suitable intervals extend from top to bottom of the fuel-containing receptacle, each inlet corresponding to a zone of oxidation, as described. Air-inlets are placed also in the reducing zone and gas-passage underneath the reducing zone; but these inlets are intended for emergency purposes only. The fuel rests upon grate-bars or arches constructed of suitable fire-resisting material. The grate is so arranged that live coals will drop through it into the reducing zone. This zone is immediately underneath the fuel-grate and is provided with a grate-floor constructed of suitable fire-resisting material and upon which are retained the live coals which drop through the upper or fuel grate until such coals have been reduced to ashes. Immediately underneath the reducing-chamber is the gas-passage and ash-pit. The grate-floor of the reducing-chamber may be omitted, if desired, and the gas-passage used as a reducing-chamber. The operation of this gas-producer is as follows: The fuel is fed through a hopper at the top, and the fire being started the fuel-receptacle is kept well filled. The valve controlling the top air-inlet of the series is opened sufficiently to admit the requisite volume of air, the measure of which is the temperature of the corresponding fuel zone. In like manner the remaining air-inlets of the series always under separate control are opened sufficiently to admit the requisite volume of air corresponding to the duty of each zone, as previously described, always proportional to the temperature of the corresponding fuel zone. The gaseous products of each zone are pulled downward always from a cooler to a hotter zone, as described, a suction-draft being employed. Finally, the gases are discharged into the reducing-chamber at a point below the last air-inlet of the series and after passing through the reducing-chamber in the presence of highly-heated or incandescent carbon are discharged underneath the grate thereof in the gas-passage leading to the gas-holder, combustion chamber, or furnace, as the case may be.

Referring to Fig. 1 of the drawings, *a* represents the front wall of the furnace, and *b* the platform above the furnace for the use of the operator, on which is located the grate-bar-operating mechanism, hereinafter described, and from which the ore is delivered into the top of the furnace. Near the bottom of the furnace is located a discharge-opening *c* for the roasted or treated ore, in which is a spiral or other conveyer *d*. *e* represents a swinging door adapted to cover the main air-inlet opening of the furnace. *g* represents the discharge-outlets for the gases after the ore has been roasted or otherwise treated, which outlets may be closed by valves *h*, operated by handles *i*. Located in front of the furnace are the dust-chutes *j*, which terminate in dust-bins *k*. The dust-chutes *j* are provided with removable doors *m* for the admission of a rake or other cleaning device, and the dust-bins $k$ are provided with doors $n$ for a similar purpose. $o$ represents the ends of the grate-bars projecting outwardly on the front of the furnace, and to each one of these bars is rigidly attached a lever $p$, and this lever is attached, by means of a link $q$, to a horizontal rod $r$, one of these rods being provided for each series of grate-bars, which divide the furnace into as many zones as desired. To the ends of the horizontal bar $k$ are secured vertical rods $s$, which are pivoted above the platform to levers $t$, supported by the brackets $u$. The levers $t$ are connected by links $v$ to a link $w$, which is pivoted to an operating-lever $x$, one end of which is provided with a handle and the other end pivoted in the support $y$ on the platform $b$. $z$ represents a support similar to $y$, to which is attached a pawl or hook 117, which engages the link $w$ for the purpose of normally holding the parts in position, as shown in Fig. 1.

The arrangement described is substantially the same for each one of the sets of grate-bars, the result being that by moving one of the levers $x$ any one of the grates may be dumped by the operator on the platform $b$. This dumping operation from zone to zone effectually stirs and mixes the ore much better than can be done by mechanical rabbling.

The preferred form of ore-supporting floors is shown in Figs. 2 and 9. 1 represents stationary bars embedded at each end in the walls of the furnace. These bars are preferably beveled off at the top, making them nearly triangular in cross-section, and are composed of any suitable heat-resisting material. These bars are separated from each other a suitable distance—say four to six inches—and underneath the opening thus formed are two swinging bars 2, adapted to swing toward each other and when their edges meet to form with the bars 1 a complete ore-floor. At the sides of the furnace proper in place of the bars 1 refractory tiles 3 are built into the walls, projecting into the furnace and having their tops beveled off.

In Fig. 9 is shown the preferred form of grate-bar, consisting of a round portion 4, provided at the rear end with a pivot-pin 5, which projects into a suitable fitting (not shown) located in the rear wall of the furnace. The circular part 4 of the grate-bars is hollow, and through the front end thereof enters a water-pipe 6, which water-pipe is open at its rear end, so that the water will flow through the pipe 6 to the rear of the grate-bar and then back again and be discharged near the front end thereof. Troughs (not shown) or any suitable water-collecting devices may be used on the front of the furnace, if desired. Made integral with the circular part 4 of the grate-bar is a projecting flange 7, beveled off on its outer edge, as shown at 8.

Referring now especially to Figs. 2 and 3, the main interior part of the furnace is divided into fifteen zones, 9 being the ore-hopper, 10, 11, 12, and 13 being the drying and preliminary heating zones, 14, 15, 16, 17, 18, 19, 20, and 21 being the roasting or treating zones, 22 and 23 being the cooling zones, and 24 being the spent-ore pit, beneath which is a hopper-shaped receptacle 25, leading down to the trough 26, in which is located the spiral discharge-conveyer $d$, which is driven by any suitable means outside the furnace. Surrounding the drying zones 10, 11, 12, and 13 on three sides thereof, as shown in Fig. 8, are located the large chambers 26, provided with staggered baffle-plates 27, which chambers act as a dust-collector as well as a means for initially heating the ore in the upper zones of the furnace. Below the zones for initially heating the ore are the heating zones 14– 21, and on each side of these zones and running down nearly to the level of the conveyer $d$ are the vertical channels or flues 28 and 29, Figs. 2 and 7, outside of which are the vertical air channels or flues 30 and 31. The channel 29 is cut off by horizontal partitions dividing it into a number of primary combustion-chambers 32, 33, 34, and 35 and a number of secondary combustion-chambers 36, 37, and 38, 39 representing the large chamber into which the gases are discharged after the ore is fully roasted or otherwise treated. Similarly, the channel 28 is provided with horizontal partitions dividing it into primary combustion-chambers 40, 41, 42, and 43 and secondary combustion-chambers 44, 45, 46, and 47, the secondary combustion-chambers in the channel 28 being located opposite the primary combustion-chambers in the channel or flue 29. In each of these flues the secondary combustion-chamber communicates with the primary combustion-chamber just below it through a floor 48, preferably composed of checkered brickwork. Openings, such as 49, connect the various ore zones with the combustion-chambers opposite to them. These openings gradually increase in size from the top downward, so that a larger quantity of air and fuel gases may be admitted therethrough. Just above the floor of each of the primary combustion-chambers, such as 35, an opening, such as 50, extends through the front wall of the furnace, which openings are located opposite the doors $m$ in the dust-chutes $j$, so that the dust may be raked from these chambers into said chutes. The chambers 26 are provided with similar openings. In each of the flues 28 and 29 the primary combustion- chambers, such as 35 and 40, are connected with the air-flues 30 or 31 by passages 51, controlled by valves 52. (See Fig. 5.) These primary chambers are also connected with the gas-supply flues by openings, such as 53, provided each with a valve, such as 54. Provision is made for supplying air from the air-flue 31 by means of a passage 102, controlled by a valve 104, to the horizontal gas-flue 99, which merges into the vertical gas-flue 100. Similarly, air is supplied through the passage 103, controlled by the valve 105, from the air-flue 30 to the horizontal gas-flue 98, which merges into the vertical gas-flue 101, Fig. 7. All of the valves have handles projecting through the side of the furnace.

Referring now to Fig. 2, the fuel-gas mixed with air enters the primary combustion-chamber 32, the amount of gas and air admitted thereto being regulated by the valves, such as 52 and 54, Fig. 5. The mixture of gas and air passes across the furnace through the zone 14 to the secondary combustion-chamber 44 on the other side of the furnace and descends through the checkered floor thereof into the primary combustion-chamber 40, into which an additional supply of fuel-gas and air is admitted, which additional supply mixed with the gases coming through the zone 14 travels through the zone 15, the result being that the temperature in the zone 15 is higher than it is in the zone 14, thus carrying out the primary principle of my invention, which is that the fuel-gas or heat-current should pass from the cooler to the hotter portions of the furnace. The current of air and gas after reaching the secondary combustion-chamber 36 passes downward through the checkered floor thereof in the primary combustion-chamber 33, where it receives an additional supply of air and fuel-gas, the combined current passing in the reverse direction through the zone 16, which is therefore heated to a higher temperature than the zone 15. This operation continues, the air and gas current flowing back and forth in opposite directions through the respective zones and being reinforced in each of the primary combustion-chambers by an additional supply of fuel-gas and air until it reaches the final heating zone 21, in which the temperature is the highest, and in cases of ore which is to be sublimed preferably above the boiling-point of the metals contained in the ore to be recovered. Thence the current of air and gas passes into the superheating-chamber 39, which incidentally is a dust-collecting chamber and is connected with the dust-collector proper.

To insure the keeping of the chamber 39 at the required temperature above the boiling-point of the metal to be sublimed in accordance with my primary purpose of superheating the final combustion-chamber 39, provision is made for an additional supply of air and fuel-gas thereto. The gas enters the combustion-chamber 56 from the gas-flue 101, which chamber is connected with the air-flue 30 in the manner already described. The current of mixed air and gas passes through a small opening 57 in the upper part of the first of the cooling zones 22 and across said zone through an opening 58 into the chamber 39. To further insure the superheating of the final combustion-chamber 39 and also the main dust-collector (shown in vertical section, Fig. 3, and in cross-section, Figs. 5 and 6) and in accordance with my primary purpose of superheating the dust-chamber, provision is made for introducing a fresh supply of fuel-gas from vertical gas-flue 100 into passage 63 through passage 64, controlled by valve 65, and a fresh supply of heated air from vertical air-flue 31 into chamber 39, conveyed through a valved passage 66. Provision is also made for supplying an additional quantity of gas to the chamber 39 from the gas-flue 100 by means of the passage 55, controlled by the valve $56^a$. The temperature in the zone 22, however, is much less than it is in the chamber 21, the reason being that, as said before, the current of air and gas traveling through the main part of the furnace steadily becomes hotter on account of the successive increments of air and gas added thereto. This current passes through the zone 21, but not through the zone 22. The latter is supplied only with a small gas and air current through the recuperative opening 57, and hence is considerably cooler than the zone 21. For example, supposing that the temperature of the gas-current in the zone 14 is 200 and the temperature of the ore in said zone is 100, the temperature of the gas is twice that of the ore, which causes a very rapid absorption of heat by the ore. Similarly, in the zone 15 the temperature of the gas is 600, and of the ore therein 300. In the zone 16 the temperatures are 1,000 and 500, respectively. In zone 17 the temperatures are 1,400 and 700, respectively. In zone 18 they are 1,800 and 900, respectively. In zone 19 they are 2,200 and 1,100, respectively, in zone 20 they are 2,600 and 1,300, respectively, and in zone 21, the final heating zone, they are 3,000 and 1,500, respectively, while in the first of the cooling zones 22 the temperature is 1,700, all these numbers being in degrees on the Fahrenheit scale. These figures are given to illustrate the regulation of the temperature slope at a uniform ratio throughout the series and are based on the assumption that it is desired to secure an ultimate induced temperature of, say, 1,700° in the ore before discharging from the last roasting zone and that the temperature of the ore when delivered from the lowest drying-chamber into the first roasting-chamber is 100, or that 1600 degrees of heat must be inducted into the ore.

Referring to Fig. 2, the air enters through the opening covered by the door $e$ and passes up through the openings 59 and 60 and thence into the air-flues 30 and 31. These air-flues communicate with openings 61 and 62, leading into the spent ore-pit, and so that air may be allowed access to the ore in said pit to cool it off. Obviously all the air that enters through the door e is heated by contact with the hot walls and interior parts of the furnace before it is discharged into the combustion-chambers. When the gas-current enters the chamber 39, superheated as above described, it expands and the greater part of the dust settles and falls into the wall 118, which is provided with an opening closed by a door 119, through which opening the dust can be raked out. The current then flows from the chamber 39 through the passage 63 and the arched opening 67 into the dust-collector. This dust-collector is elliptical in shape and divided throughout the greater part of its length into two parts by means of a vertical partition 68. Horizontal partitions 69, 70, 71, and 72 divide these parts into pairs of chambers 73, 74, 75, 76, 77, 78, 79, and 80. The gas entering the chamber 73 flows along the partition 68 until it reaches the opposite end of the chamber, where it rises and passes through the opening 81 into the chamber 74. The gases then flow along in the chamber 74 until they reach the opening 82 in the bottom of the partition 69, when they rise and flow along the division-wall 68 until they reach the opening 83, through which they pass into the chamber 76. This operation is continued until the gases reach the top chamber 84, flowing from side to side and back and forth through these chambers, and passing through constricted openings into the next chamber. The effect of passing through these small openings and then expanding into larger chambers causes the current to be arrested, thereby depositing the dust. The top chamber 84 of the dust-collector is in the rear of the initial heating zones 10, 11, 12, and 13, and it communicates with the chambers 26, in which the baffle-plates 27 are located, surrounding said initial heating-chambers on three sides, as shown in Fig. 8.

My apparatus for producing fuel-gas by my process of gradual combustion of fuel will next be described. This apparatus produces a pure gas without the use of scrubbers or purifiers.

85 represents the fuel-receptacle, located on the rear of the furnace and provided with a fuel-hopper 86, closed by a swinging cover 87, a conveyer 88 being located in proximity thereto. The fuel-hopper is provided with a sliding plate or door 116, which separates it from the fuel-receptacle proper. Connected to the fuel-hopper 86 is a smoke-pipe 89, which may be desirable to use in starting up the furnace or shutting it down. The pipe 89 is provided with a movable valve 90, which in the ordinary operation of the furnace is closed.

91 represents a removable cover in the pipe 89, so that access may be had to the valve 90 for the purpose of luting it in position when desired.

The form of gas-producer best adapted for my purpose is of the suction type, the air being forcibly drawn in through the gas-producer and the entire furnace.

The fuel-chamber 85 is provided with a grate 93 of any suitable construction and also with a supplemental grate 94, located a short distance below the grate 93 for the purpose of catching and retaining any incandescent coals which may pass through the grate 93. The fuel-chamber 85 is provided with a number of openings, such as 95, for the admission of air. Each opening is provided with a valve 96, so that the amount of air admitted to any part of the gas-producer may be exactly regulated in proportion to the temperature of the fuel in the zone corresponding to each air-inlet, and the amount of air admitted is so regulated that the lowest temperature is at the top where the fuel is fed in, and the temperature gradually and steadily increases, beginning with the zone of nascent combustion corresponding to the topmost inlet and extending through a series of merging zones of progressive combustion until the gas is discharged into the gas-holder, this being a part of my principle of gradual combustion.

97 represents the gas-holder, which is simply a large chamber built up into the base of the furnace and which communicates, by means of horizontal passages 98 and 99, Fig. 7, with the gas-flues 100 and 101, located immediately in the rear of the series of combustion-chambers on either side of the furnace, as previously described. The gas-holder and the passages leading therefrom to the furnace are provided at intervals with air-inlet openings (not shown) in accordance with my principle of gradual combustion.

The gas-flues 100 and 101 are closed at the top, the flue 100 being bent, as shown in Fig. 4. These flues communicate directly with the primary combustion-chambers on either side of the furnace, as best shown in Fig. 4, through openings, such as 53, which are adapted to be closed by valves 54, provided with handles projecting through the wall of the furnace, the construction being practically the same on each side of the furnace.

Beneath the grate 94 is a trough 109 for the reception of the ashes. Means are provided for cleaning the lower part of the gas-producer and gas-holder, 110 representing a rake-opening in the side of the furnace adapted to be closed in any suitable way and 111 representing a similar opening closed by a cap. In front of the trough 109 is a removable door 112, through which the ashes may be raked out. In short, provision is made for cleaning out nearly all the different parts of the furnace by appropriate openings covered by doors.

113 represents an opening in front of the furnace leading to the spent-ore pit, which is provided with a swinging door 114, to which access may be obtained to said pit when desired, and 115 represents the sliding bottom of the ore-hopper 9.

The air-inlet openings below the grate-bars 93 and 94 are usually kept closed, and in this case the chamber between these sets of grate-bars acts as a reducing zone, reducing, by the action of the incandescent coals on said grate-bars, any carbonic-acid gas ($CO_2$) to carbonic oxid, (CO.) If it should happen that there is too large an accumulation of coals on and underneath the grate-bars 94, the surplus carbon may be easily and quickly burned by opening one or both of the two lowest air-inlets.

The operation of the furnace is as follows: Assuming each zone of the ore-tower to contain a charge of ore and the ore in the last treating zone 21 to be fully treated, the grate-bars of the cooling zone 23 are opened, dumping the ore into the spent-ore pit 24. These grate-bars are then immediately closed, and the bars of zone 22 opened and the ore dumped into the now vacant zone 23. This operation is repeated from zone to zone until the hopper 9 has been emptied and is ready for a fresh charge. Each series of bars is operated by a single lever, and these levers being located on the charging-floor the entire dumping operation occupies but a few minutes. The spent ore being discharged by the spiral conveyer operated by power, the furnace operator is not required to leave the charging-floor during the entire dumping operation. In fact, after the furnace has been started in operation and the air and gas valves properly adjusted the operator is not required to leave the charging-floor at all except for the purpose of charging additional fuel from time to time into the gas-producer. In treating mercury sulfid ores I have obtained the best results in practice by using a charge covering the ore-floor from six to nine inches deep and have been able to secure a perfect roast in four hours. In a furnace with eight roasting floors or zones, as shown in the drawings one charge would be dumped every thirty minutes. The dumping serves to thoroughly mix the ore better than could be done by mechanical rabbling.

My invention is especially applicable to ores from which the metal is to be sublimed, such as quicksilver, lead, zinc; but it is by no means restricted to such ores or apparatus. The essential principle of the furnace may be used in connection with the sublimation or chloridizing or roasting or smelting of ores and is of general application. In fact, it is useful for other purposes in which it is desired to gradually heat or treat by the aid of heat any kind of material. Furthermore, the gas-producer is useful not only with the particular furnace described, but with any sort of furnace or as a separate means of producing gas for general use.

I have shown in the drawings a vertical ore-tower; but my invention is not limited to this arrangement, the essential features being that the ore or other material treated is divided into units, not necessarily by division walls or floors, and that these units in succession are subjected to increasing amounts of heat, the ore or other material always traveling from a cooler to a hotter part of the furnace and being finally discharged from the hottest portion thereof at the end of the treatment.

Having thus described my invention, what I claim as new, and desire to secure by Letters Patent, is—

1. In an apparatus of the character described, the combination of a furnace having the part adapted to receive the material under treatment divided into chambers, and means for causing said material to move successively from chamber to chamber, said receiving part being supplied with a current of heat moving in the same general direction with the travel of the material under treatment, substantially as described.

2. In an apparatus of the character described, the combination of a furnace having its ore-receptacle divided into chambers, and provided with means for causing a current of fuel-gas and air in regulated quantities to flow through said chambers in the same general direction as the ore travels, substantially as described.

3. In an apparatus of the character described, the combination of a furnace having the receptacle for the material under treatment divided into a series of chambers, means for causing the material under treatment to move successively from chamber to chamber at intervals, said furnace being supplied with a current of fuel-gas and heated air under control, said current moving transversely through said chambers, but in the same general direction of the travel of the material under treatment, and said furnace being provided with means whereby each chamber of the series is supplied with a fresh increment of fuel-gas and heated air under control, substantially as described.

4. In an apparatus of the character described, the combination of a furnace having its ore-receptacle divided into a series of zones, means for causing a heat-bearing current to flow in regulated quantities through said series of zones, said furnace being provided with means whereby said heat-bearing current is augmented under control, in successive zones in the general direction of the ore travel, and said furnace being provided with means whereby ore is caused to move at intervals from zone to zone, but always from a cooler to a hotter zone, substantially as described.

5. In an apparatus of the character described, the combination of a furnace divided into zones, means for transferring the ore from zone to zone at intervals, said furnace having a series of primary and secondary combustion-chambers located on opposite sides of said zones, and means for supplying the fuel-gas and air to said primary combustion-chambers, substantially as described.

6. In an apparatus of the character described, the combination of a furnace divided into zones, means for permitting the ore to pass from one zone to the next in succession, said furnace having a series of primary and secondary combustion-chambers on each side of said zones and in line therewith, the primary chambers in one series being located opposite to the secondary chambers of the other series, and each secondary chamber communicating with the primary chamber just next to it, and means for supplying heat to said primary chambers, substantially as described.

7. In an apparatus of the character described, the combination of a furnace divided into zones and having movable floors for said zones, whereby the ore is allowed to pass from zone to zone at the proper time, said furnace being provided with a double series of alternately-arranged primary and secondary combustion-chambers in line with said zones and on opposite sides thereof, the primary chambers of one series being located opposite to the secondary zones of the other series and the secondary chambers of each series communicating respectively with the primary chambers next to them, and means for supplying heat to said primary chambers, substantially as described.

8. In an apparatus of the character described, the combination of a furnace provided with floors, dividing it into zones, said floors being partly composed of swinging grate-bars, means for operating all the movable grate-bars of one floor simultaneously, said furnace being provided with a double series of primary and secondary combustion-chambers, located on either side of said zones in line therewith, the primary chambers of one series being located opposite the secondary chambers of the other series, and means for supplying regulated quantities of fuel-gas and air to each of said primary chambers, substantially as described.

9. In an apparatus of the character described, the combination of a furnace, floors, composed of stationary bars and pivoted grate-bars, dividing said furnace into zones, means for operating all the pivoted grate-bars of one floor simultaneously, said furnace having a series of primary and secondary combustion-chambers on either side of said zones and in line therewith and also provided with inlets from said chambers to said zones, said inlets increasing in size from the upper set downward, and means for delivering a mixture of fuel-gas and heated air to each of said primary chambers, substantially as described.

10. In an apparatus of the character described, the combination of a furnace having external and internal walls, the latter forming an ore-tower, floors dividing said ore-tower into zones, a series of alternately-arranged superposed primary and secondary chambers located on either side of said zones in line therewith, inlets between said zones and the chambers opposite them, air-flues located one in proximity to each of said series, gas-flues, and inlets from said gas-flues and air-flues into each of said primary combustion-chambers, with means for supplying fuel-gas to said gas-flues, substantially as described.

11. In an apparatus of the character described, the combination of a furnace having a central ore-tower, floors dividing said ore-tower into zones, a series of primary and secondary combustion-chambers located on either side of said zones, in line with each other and said zones, the secondary chambers of one series communicating respectively with the primary chambers just next to them, valved air-flues and gas-flues communicating with said primary chambers, a final superheating-chamber through which all of the gases pass, dust-collecting chambers, and means for supplying fuel-gas to said gas-flues, substantially as described.

12. In an apparatus of the character described, the combination of a furnace having a central ore-tower divided into zones by floors adapted to allow the ore to pass from one to the other at intervals, a series of primary and secondary superposed alternately-arranged combustion-chambers located on either side of a portion of said ore-tower and opposite to and in line with said zones, the primary combustion-chambers of one series being located opposite the secondary combustion-chambers of the other series, and the secondary combustion-chambers of each series communicating respectively with the primary combustion-chambers immediately below them, air-flues located one in proximity to each of said series of combustion-chambers, inlets between said zones and said combustion-chambers, gas-flues, and valved passages between said gas-flues and air-flues and said primary combustion-chambers, a final superheating-chamber, dust-collecting chambers, means for preliminarily heating the ore in the upper zones, some of said zones acting as cooling zones, and means for supplying fuel-gas to said gas-flues, substantially as described.

13. In an apparatus of the character described, the combination of a furnace provided with a hopper and a central ore-tower, said ore-tower being divided into zones by floors which permit the ore to pass from one floor to another at the proper times, a spent-ore chamber underneath said ore-tower, a series of alternately-arranged primary and secondary combustion-chambers arranged in proximity to some of the zones in said ore-tower on either side thereof and in line therewith, inlets connecting said zones with the corresponding combustion-chambers, the primary combustion-chambers of one series being located opposite to the secondary combustion-chambers of the other series, and the secondary combustion-chambers of each series communicating respectively with the primary combustion-chambers just below them, air-flues and gas-flues located one in proximity to each of said series of primary and secondary combustion-chambers, valved passages connecting said air-flues and gas-flues with the primary combustion-chambers of each series, a final superheating-chamber, dust-collecting chambers, means for preliminarily heating the ore in the upper zones of the ore-tower, with a conveyer for discharging the treated ore, and means for supplying gas to said gas-flues, substantially as described.

14. In an apparatus of the character described, the combination of a furnace provided with a central ore-tower and a valved hopper, said ore-tower being divided into zones by floors adapted to permit the ore to pass from floor to floor at proper times, a series of primary and secondary combustion-chambers located on either side of some of said zones, and in line therewith, inlets increasing in size from the top downward connecting said zones with the combustion-chambers opposite them, the secondary combustion-chambers of one series being located opposite the primary combustion-chambers of the other series, and the secondary combustion-chambers of each series communicating respectively with the primary combustion-chambers next to them, gas-flues and air-flues one located in proximity to each of said series of combustion-chambers, valved passages connecting said air-flues and said gas-flues with the primary combustion-chambers of each series, some of said zones acting as cooling zones, a final superheating-chamber, means for introducing fuel-gas and air into said heating-chamber, a series of dust-collecting chambers, means for preliminarily heating the ore in the upper zones of the furnace, and a spent ore-pit, with a conveyer for discharging the treated ore, and means for supplying fuel-gas to said gas-flues, substantially as described.

15. In an apparatus of the character described, the combination of a furnace divided into zones by floors, each of said floors being composed partly of stationary grate-bars, and partly of movable grate-bars, links connecting said movable grate-bars to a horizontal bar, and connections extending from each of said horizontal bars up above the charging-floor and terminating in an operating-lever, whereby the movable grate-bars on any one of said floors may be simultaneously tilted by the operator on the charging-floor, substantially as described.

16. In an apparatus of the character described, the combination of a furnace having a central ore-tower divided into zones, floors separating said zones, each of said floors being composed of stationary grate-bars let into the furnace-walls, and movable grate-bars pivotally supported beneath said stationary bars, each of said movable bars being hollow and provided with a projecting lip adapted to meet with the lip on the corresponding bar, means for cooling said hollow grate-bars, connections between the ends of each hollow grate-bar of a single floor and a horizontal bar, connections running from each horizontal bar above the charging-floor of the furnace and terminating in an operating-lever, and a weight attached to each of said levers, substantially as described.

17. In an apparatus of the character described, the combination of a furnace, a gas-holder built into the structure of said furnace, and means for supplying pure fuel-gas to said gas-holder, consisting of a vertical fuel-receptacle provided with a pivoted top, and a smoke-stack provided with a valve, said fuel-receptacle being provided with a grate, and with a series of air-inlets passing through the wall thereof, each of said air-inlets being provided with a valve, whereby the products of combustion are compelled to pass always from a cooler zone of oxidation to a hotter zone, substantially as described.

18. In an apparatus of the character described, the combination of a furnace containing an ore-tower, a gas-holding chamber built into the furnace structure and communicating with said ore-tower, and a gas-producer connected with said chamber and including a vertical fuel-receptacle, a fuel-hopper provided with a pivoted top thereon, and a smoke-stack having a valve therein, a double series of grate-bars, and a series of air-inlets, each provided with a valve passing through the wall of said gas-producer, the parts being so arranged that the products of combustion are drawn through the gas-producer in a direction from a cooler zone of oxidation to a hotter zone, substantially as described.

19. In an apparatus of the character described, the combination of a furnace, a gas-holder built into the structure thereof and means for supplying pure fuel-gas to said gas-holder, consisting of a vertical fuel-receptacle connected to said gas-holder and two sets of grate-bars therein, providing a reducing zone between them, said fuel-receptacle being provided with a series of valved air-inlet openings in its wall, substantially as described.

In testimony whereof I affix my signature in presence of two witnesses.

WILLIAM B. DENNIS.

Witnesses:
 GEO. A. BYRNE,
 MYRON G. CLEAR.